(12) United States Patent
Lee et al.

(10) Patent No.: US 8,932,491 B2
(45) Date of Patent: Jan. 13, 2015

(54) ORGANIC-INORGANIC HYBRID COMPOSITION FOR ANTI-CORROSIVE COATING AGENT AND MANUFACTURING METHOD FOR THE SAME

(75) Inventors: Hyung Oh Lee, Gyeonggi-do (KR); Hyun Min Kim, Gyeonggi-do (KR); Jeung Euy Song, Gyeonggi-do (KR); Soo Ryang Park, Gyeonggi-do (KR); Kyong Ho Jang, Seoul (KR)

(73) Assignee: L'Beste Gat Ltd., Seoul (KR)

( * ) Notice: Subject to any disclaimer, the term of this patent is extended or adjusted under 35 U.S.C. 154(b) by 353 days.

(21) Appl. No.: 13/577,654

(22) PCT Filed: Jan. 27, 2011

(86) PCT No.: PCT/KR2011/000562
§ 371 (c)(1),
(2), (4) Date: Aug. 7, 2012

(87) PCT Pub. No.: WO2011/099709
PCT Pub. Date: Aug. 18, 2011

(65) Prior Publication Data
US 2012/0305849 A1 Dec. 6, 2012

(30) Foreign Application Priority Data
Feb. 9, 2010 (KR) .................. 10-2010-0012103

(51) Int. Cl.
| | | |
|---|---|---|
| C09K 3/00 | (2006.01) | |
| C23F 11/00 | (2006.01) | |
| C08G 18/10 | (2006.01) | |
| C09D 5/10 | (2006.01) | |
| C09D 7/12 | (2006.01) | |
| C09D 175/04 | (2006.01) | |
| C09D 183/02 | (2006.01) | |
| C08K 3/08 | (2006.01) | |

(52) U.S. Cl.
CPC .............. *C08G 18/10* (2013.01); *C09D 5/106* (2013.01); *C09D 7/1283* (2013.01); *C09D 7/1291* (2013.01); *C09D 175/04* (2013.01); *C09D 183/02* (2013.01); *C08G 2150/90* (2013.01); *C08K 3/08* (2013.01)
USPC .................. 252/389.1; 252/387; 252/389.31; 252/389.52

(58) Field of Classification Search
CPC ...... C08G 18/10; C08G 2150/90; C08K 3/08; C09D 175/04; C09D 7/1291
USPC ...................... 252/387, 389.1, 389.31, 389.52
See application file for complete search history.

(56) References Cited

U.S. PATENT DOCUMENTS

| | | | |
|---|---|---|---|
| 4,719,132 A | | 1/1988 | Porter, Jr. |
| 5,147,829 A | * | 9/1992 | Hench et al. ..................... 501/12 |
| 5,158,605 A | * | 10/1992 | Kissel ......................... 106/14.11 |
| 5,166,248 A | * | 11/1992 | Kissel ............................ 524/398 |
| 5,326,594 A | * | 7/1994 | Sabata et al. ..................... 427/327 |
| 5,612,414 A | * | 3/1997 | Becker et al. .................. 525/102 |
| 5,814,137 A | * | 9/1998 | Blohowiak et al. ......... 106/14.13 |
| 5,879,794 A | * | 3/1999 | Korleski, Jr. ............... 428/317.1 |
| 5,962,608 A | * | 10/1999 | Ryang et al. ..................... 526/89 |
| 6,063,826 A | * | 5/2000 | Biesmans et al. .............. 521/158 |
| 6,482,525 B1 | * | 11/2002 | Kasemann et al. ........... 428/447 |
| 6,579,472 B2 | * | 6/2003 | Chung et al. .............. 252/389.31 |
| 6,605,365 B1 | | 8/2003 | Krienke et al. |
| 7,723,394 B2 | * | 5/2010 | Klimov et al. ................... 516/98 |
| 8,058,347 B2 | * | 11/2011 | Shelekhov ..................... 525/100 |
| 8,130,438 B2 | * | 3/2012 | Agrawal et al. ............... 359/275 |
| 8,399,558 B2 | * | 3/2013 | Kang et al. ..................... 524/560 |
| 8,628,689 B2 | * | 1/2014 | Visser et al. .............. 252/389.62 |
| 8,748,007 B2 | * | 6/2014 | Scott et al. ..................... 428/626 |
| 2002/0086168 A1 | * | 7/2002 | Sadvary et al. ................ 428/447 |
| 2003/0024432 A1 | * | 2/2003 | Chung et al. ................ 106/14.12 |
| 2003/0114568 A1 | * | 6/2003 | Sato ............................. 524/431 |
| 2003/0172845 A1 | * | 9/2003 | Marx et al. ..................... 106/425 |
| 2004/0009344 A1 | * | 1/2004 | Krienke et al. ................ 428/328 |
| 2004/0044112 A1 | * | 3/2004 | Sullivan et al. ................ 524/443 |
| 2004/0063844 A1 | * | 4/2004 | Urs ................................ 524/492 |
| 2004/0097641 A1 | * | 5/2004 | Wagner .......................... 524/589 |
| 2004/0142115 A1 | * | 7/2004 | Jaworek et al. ................ 427/508 |
| 2004/0159824 A1 | * | 8/2004 | Ryang ....................... 252/389.31 |
| 2004/0167266 A1 | * | 8/2004 | Hasegawa et al. ............. 524/406 |
| 2004/0259992 A1 | * | 12/2004 | Gobel ............................ 524/261 |
| 2005/0037146 A1 | * | 2/2005 | LeFave ........................ 427/372.2 |
| 2005/0123684 A1 | | 6/2005 | Makowski et al. |
| 2005/0159524 A1 | * | 7/2005 | Rajagopalan et al. ........ 524/432 |
| 2005/0182153 A1 | * | 8/2005 | Yokoi ............................ 523/122 |
| 2005/0208319 A1 | * | 9/2005 | Finley et al. ................... 428/545 |
| 2005/0244660 A1 | * | 11/2005 | Yuasa et al. ................... 428/457 |

(Continued)

FOREIGN PATENT DOCUMENTS

| | | |
|---|---|---|
| KR | 10-0845403 B1 | 7/2008 |
| KR | 10-0848671 B1 | 7/2008 |

OTHER PUBLICATIONS

International Search Report with English translation, mailing date Nov. 21, 2011, for corresponding International Application No. PCT/KR2011/000562.

*Primary Examiner* — Liam J Heincer
(74) *Attorney, Agent, or Firm* — Intellectual Property Law Group LLP

(57) ABSTRACT

The present invention relates to a composition for an anti-corrosive coating agent and a manufacturing method for same. The present invention includes: a metal flake; a sol-gel resin; a polyurethane prepolymer having NCO % of 2.5-3.1 and average molecular weight of 70,000-100,000; and a solvent.

9 Claims, No Drawings

(56) References Cited

U.S. PATENT DOCUMENTS

| | | |
|---|---|---|
| 2006/0165989 A1* | 7/2006 | Takikawa et al. .......... 428/402.2 |
| 2006/0167147 A1* | 7/2006 | Asgari .......................... 524/174 |
| 2006/0270790 A1* | 11/2006 | Comeau ....................... 524/847 |
| 2007/0128351 A1* | 6/2007 | Nanna et al. .................. 427/180 |
| 2007/0173564 A1* | 7/2007 | Sohn et al. ................... 523/210 |
| 2008/0017071 A1* | 1/2008 | Moebus et al. ........... 106/287.24 |
| 2008/0102126 A1* | 5/2008 | Kohler et al. ................. 424/486 |
| 2008/0193743 A1* | 8/2008 | Kruse et al. .................. 428/332 |
| 2008/0260950 A1* | 10/2008 | Schottner ..................... 427/302 |
| 2008/0281025 A1* | 11/2008 | Nennemann et al. ......... 524/261 |
| 2008/0305341 A1* | 12/2008 | Plieth et al. .................. 428/419 |
| 2009/0008613 A1* | 1/2009 | Nennemann et al. ......... 252/589 |
| 2009/0047436 A1* | 2/2009 | Nakaguma et al. ........... 427/387 |
| 2009/0206341 A1* | 8/2009 | Marks et al. .................... 257/66 |
| 2009/0208639 A1* | 8/2009 | Yun et al. .................... 427/126.3 |
| 2009/0233048 A1* | 9/2009 | Murata et al. ................. 428/143 |
| 2010/0002282 A1* | 1/2010 | Agrawal et al. ............... 359/275 |
| 2010/0006005 A1* | 1/2010 | Roesch et al. ............. 106/287.1 |
| 2010/0092710 A1* | 4/2010 | Welker et al. ................. 428/36.9 |
| 2010/0104810 A1* | 4/2010 | Fukazawa et al. ............ 428/147 |
| 2010/0124649 A1* | 5/2010 | Rukavina et al. .......... 428/292.1 |
| 2010/0159144 A1* | 6/2010 | Standke et al. ............... 427/387 |
| 2010/0234529 A1* | 9/2010 | Shelekhov .................... 525/100 |
| 2011/0092653 A1* | 4/2011 | Schwab ........................ 525/370 |
| 2012/0298923 A1* | 11/2012 | Lee et al. .................. 252/389.32 |
| 2014/0000480 A1* | 1/2014 | Kim et al. .................. 106/286.6 |

* cited by examiner

ORGANIC-INORGANIC HYBRID COMPOSITION FOR ANTI-CORROSIVE COATING AGENT AND MANUFACTURING METHOD FOR THE SAME

TECHNICAL FIELD

The present invention relates to an anti-corrosive coating agent, and, more particularly, to a composition for an anti-corrosive coating agent, which includes an organic-inorganic hybrid resin, and to a method of manufacturing the same.

BACKGROUND ART

Anti-corrosive coating agents are applied on a target to form a coating film so that the target is protected from pollution or corrosion, and are particularly widely utilized in order to protect the outer surface of metal parts which are assembled or coupled with a variety of products manufactured in many industrial fields.

An anti-corrosive coating agent is typically composed of metal powder mainly responsible for imparting the anti-corrosive function, an organic solvent, and a variety of additives which impart heat resistance, weather resistance, add thermal stability, anti-corrosion, etc.

In order to improve performance of the anti-corrosive coating agent, methods using a variety of additives have been developed, and with the recent advancement of nano technologies, attempts have been made to introduce an organic-inorganic hybrid material having novel properties, which compensate for opposite properties such as strength, heat resistance and stability of inorganic ceramics, and light-weightness, ductility, elasticity and moldability of organic polymers, in the field of anti-corrosive coating agents, which is still under study.

Meanwhile, Korean Patent No. 10-0848671 discloses a method of forming two composite coating layers including forming a metal film and forming an anti-corrosive film thereon, and a composition for use therein.

Specifically, a metal plating layer is formed on a target, after which a composition for anti-corrosive paint is applied on the metal plating layer to form an anti-corrosive film which is then cured at a high temperature of 280~350° C., thus forming a composite plating layer.

This method is a two-coating and one-baking procedure, and so exhibits better anti-corrosion compared to other methods of forming an anti-corrosive coating layer, but is problematic because a coating has to be applied two times.

DISCLOSURE

Technical Problem

Accordingly, the present invention has been made keeping in mind the above problems occurring in the related art, and an object of the present invention is to provide an organic-inorganic hybrid composition for an anti-corrosive coating agent, in which the organic-inorganic hybrid anti-corrosive composition including a sol-gel resin as an organic component and a polyurethane prepolymer as an inorganic component may exhibit superior properties including corrosion resistance, chemical resistance, weather resistance, mechanical strength and so on even upon applying just a single coating, and the coating process is simple, and also provide a method of manufacturing the same.

Technical Solution

An aspect of the present invention provides an organic-inorganic hybrid composition for an anti-corrosive coating agent, including metal flakes; a sol-gel resin; a polyurethane prepolymer having an NCO % of 2.5~3.1 and a weight average molecular weight of 70,000~100,000; and a solvent.

As such, the metal flakes may be zinc flakes and may have a major axis of 5~10 μm in length.

Furthermore, the metal flakes may be used in an amount of 80~110 parts by weight, and the solvent may be used in an amount of 100~150 parts by weight.

The sol-gel resin may be used in an amount of 140~210 parts by weight, and the polyurethane prepolymer may be used in an amount of 200~250 parts by weight.

The sol-gel resin preferably comprises a resin selected from the group consisting of zirconium butoxide, isopropyl titanate, gamma-methacryloxypropyltrimethoxysilane, n-phenyl-gamma-aminopropyltrimethoxysilane and mixtures thereof.

Furthermore, the sol-gel resin preferably comprises 30~50 parts by weight of zirconium butoxide, 10~20 parts by weight of isopropyl titanate, 40~60 parts by weight of gamma-methacryloxypropyltrimethoxysilane and 60~80 parts by weight of n-phenyl-gamma-aminopropyltrimethoxysilane.

Another aspect of the present invention provides a method of manufacturing an organic-inorganic hybrid composition for an anti-corrosive coating agent, including 1) mixing a solvent, metal flakes, and a sol-gel resin to create a mixture; and 2) mixing the mixture with a polyurethane prepolymer having an NCO % of 2.5~3.1 and a weight average molecular weight of 70,000~100,000 and performing stirring.

As such, in 2) the temperature is preferably maintained at 20~30° C.

Furthermore, in 2) the stirring rate is preferably maintained at 1000~1500 rpm.

Advantageous Effects

According to an embodiment of the present invention, an organic-inorganic hybrid composition for an anti-corrosive coating agent can exhibit superior properties including corrosion resistance, chemical resistance, weather resistance, mechanical strength and so on even upon applying just a single coating, and the coating process thereof is simple making it possible to effectively utilize the composition as an anti-corrosive agent for car disks, bolts and nuts.

Best Mode

According to an embodiment of the present invention, an organic-inorganic hybrid composition for an anti-corrosive coating agent includes metal flakes, a sol-gel resin, a self-emulsified polyurethane prepolymer, and a solvent.

The metal flakes are the main material which imparts the anti-corrosive function to an anti-corrosive coating agent, and preferable examples thereof include aluminum flakes, aluminum-magnesium alloy flakes, and zinc flakes. Particularly useful are zinc flakes. As such, the metal flakes preferably have a major axis of 5~10 μm in length. If the major axis thereof is less than 5 μm, oxidation takes place easily. In contrast, if the major axis thereof is more than 10 μm, acid resistance may decrease.

The major axis of the metal flakes indicates the longest line among lines drawn across the surface of the flake. Although metal flakes have slightly different sizes, the length of the major axis of flakes which are distributed in the greatest number or an average length of the major axis will be taken as the length of the major axis of the flake.

The amount of metal flakes that are used is preferably 80~110 parts by weight. If the amount of the metal flakes is less than 80 parts by weight, corrosion resistance may decrease. In contrast, if the amount thereof exceeds 110 parts by weight, adhesion may decrease.

The sol-gel resin is a gel-form resin resulting from a sol-gel reaction. This sol-gel resin includes at least one selected from the group consisting of zirconium butoxide, isopropyl titanate, gamma-methacryloxypropyltrimethoxysilane, n-phenyl-gamma-aminopropyltrimethoxysilane and mixtures thereof and is thus used as an inorganic component.

The sol-gel resin has high bondability to the metal flakes and dense tissue, and is superior in corrosion resistance, acid resistance, heat resistance and scratch resistance.

The sol-gel resin is preferably added in an amount of 140~210 parts by weight. More preferably, the amount of the sol-gel resin is set to 140~210 parts by weight using 30~50 parts by weight of zirconium butoxide, 10~20 parts by weight of isopropyl titanate, 40~60 parts by weight of gamma-methacryloxypropyltrimethoxysilane and 60~80 parts by weight of n-phenyl-gamma-aminopropyltrimethoxysilane.

If the amount of the sol-gel resin is less than 140 parts by weight, scratch resistance may decrease. In contrast, if the amount thereof is more than 210 parts by weight, storage stability may deteriorate.

The polyurethane prepolymer is an organic component which is added to increase corrosion resistance and impact resistance compared to when the sol-gel resin is used alone, and a polyurethane prepolymer having an NCO % of 2.5~3.1 and a weight average molecular weight of 70,000~100,000 is useful.

As such, the polyurethane prepolymer is self-emulsified and is prepared by polymerizing an isocyanate and a plyol, and examples of the isocyanate include isophorone diisocyanate, hexamethylene diisocyanate, and cyclohexane diisocyanate, and examples of the polyol include polycarbonate polyol, polyether polyol, polyester polyol, etc.

If the NCO % of the polyurethane prepolymer is less than 2.5 or more than 3.1, a portion of the sol-gel resin is not present within the urethane prepolymer particles but is dispersed in external water, undesirably decreasing acid resistance and corrosion resistance and deteriorating storage stability, thereby generating precipitates. Also, if the weight average molecular weight thereof is less than 70,000, impact resistance is decreased. For example, in the case of cars whose disk or caliper is coated with the agent, these objects may collide with another object and cause the coating to possibly peel off. In contrast, if the weight average molecular weight thereof is more than 100,000, this component is not finely dispersed in an aqueous solution, making it difficult to form a product.

Unlimited examples of the solvent include water, acetone, dipropyleneglycol, butyl diglycol, isopropyl alcohol, etc. Particularly useful is acetone.

Also, the organic-inorganic hybrid composition for an anti-corrosive coating agent according to the present invention may further include an additive such as a defoamer, a dispersant, and a surface modifier, or an organic solvent which controls the curing rate, and does not limit the addition of other additives. For example the defoamer may include a silicone-modified polyoxypropylene-based defoamer, and the dispersant may include a polyoxyethyleneether-based dispersant, and the surface modifier may include glycidoxypropyltrimethoxysilane.

In addition, a method of manufacturing the anti-corrosive metal film composition according to another embodiment of the present invention includes two steps. Specifically, the first step is mixing a solvent, metal flakes, and a sol-gel resin together. After mixing, the temperature is maintained at 20~30° C.

Next, the second step is mixing the mixture of the first step with a polyurethane prepolymer and performing stirring, in which the stirring rate is maintained at 1000~1500 rpm and the stirring time is 10~30 minutes.

As such, the NCO % of the polyurethane prepolymer resulting from reacting a polyol with an isocyanate is 2.5~3.1.

EXAMPLE

Example 1

130 parts by weight of water was mixed with 90 parts by weight of zinc flakes having a major axis of 10 μm in length, 40 parts by weight of zirconium butoxide, 10 parts by weight of isopropyl titanate, 50 parts by weight of gamma-methacryloxypropyltrimethoxysilane and 70 parts by weight of n-phenyl-gamma-aminopropyltrimethoxysilane. After mixing the above components, under conditions of a temperature being adjusted to 25° C. and a stirring rate being set to 1500 rpm, 230 parts by weight of a self-emulsified polyurethane prepolymer comprising isophorone diisocyanate and polycarbonate polyol having an NCO % of 2.8 and a weight average molecular weight of 90,000 was added to the mixture and dispersed for 10 minutes, yielding an organic-inorganic hybrid anti-corrosive coating agent according to the present invention.

As such, the isopropyl titanate used had a molecular weight of 500 and the zirconium butoxide used had a molecular weight of 383.

The gamma-methacryloxypropyltrimethoxysilane had a molecular weight of 248.4, and the n-phenyl-gamma-aminopropyltrimethoxysilane had a molecular weight of 255.4. The polyurethane prepolymer used as an organic resin was a self-emulsified polyurethane prepolymer having an NCO % of 2.5~3.1 and a weight average molecular weight of 70,000~100,000 obtained by mixing carbonate polyol, dimethylpropionic acid and a catalyst, adjusting the temperature to 80° C. and adding isophorone diisocyanate so that the reaction ran for 3~5 hours.

Example 2

An anti-corrosive metal film composition was manufactured under the same mixing conditions as in Example 1, with the exception that the polyurethane prepolymer was used in an amount of 200 parts by weight.

Example 3

An anti-corrosive metal film composition was manufactured under the same mixing conditions as in Example 1, with the exception that the polyurethane prepolymer was used in an amount of 250 parts by weight.

Example 4

An anti-corrosive metal film composition was manufactured as in Example 1, with the exception that zinc flakes having a major axis of 8 μm in length were used.

Example 5

An anti-corrosive metal film composition was manufactured under the same conditions as in Example 1, with the exception that the NCO % of the polyurethane prepolymer was 3.1.

Comparative Example 1

An organic-inorganic hybrid anti-corrosive coating agent was manufactured under the same mixing conditions as in Example 1, with the exception that the NCO % of the polyurethane prepolymer was 2.0.

Comparative Example 2

An organic-inorganic hybrid anti-corrosive coating agent was manufactured under the same mixing conditions as in Example 1, with the exception that the NCO % of the polyurethane prepolymer was 3.5.

Comparative Example 3

An organic-inorganic hybrid anti-corrosive coating agent was manufactured under the same mixing conditions as in Example 1, with the exception that the polyurethane prepolymer was used in an amount of 300 parts by weight.

Test Example

The organic-inorganic hybrid anti-corrosive coating agents of the examples and comparative examples were applied onto the surface of the disk of a car using a spraying process thus forming anti-corrosive films having a thickness of 15~20 μm, and then their acid resistance, waterproof adhesion and corrosion resistance were measured. The results are shown in Table 1 below. All of the anti-corrosive films were cured at 120° C. for about 10 minutes. The specific methods are summarized in Table 1 below.

TABLE 1

| Item Evalulated | Evaluation Method | Example | | | | | Comparative Example | | |
|---|---|---|---|---|---|---|---|---|---|
| | | 1 | 2 | 3 | 4 | 5 | 1 | 2 | 3 |
| Acid Resistance | After immersion in 10% Hydrofluoric acid solution for 30 minutes, there was no swelling, splitting, peeling | ○ | ○ | ○ | ○ | ○ | X | X | ○ |
| Waterproof Adhesion | After immersion in water at 40 ± 2° C. for 120 hours, there are no swelling, splitting, discoloration, and low attachment | ○ | ○ | ○ | ○ | ○ | ○ | ○ | X |
| Corrosion Resistance | 5% NaCl solution saline spraying test (hours) | 2000 | 900 | 800 | 800 | 800 | 500 | 400 | 300 |

(○: good, X: poor)

As is apparent from Table 1, the organic-inorganic hybrid coating compositions of the examples according to the present invention exhibited superior acid resistance, waterproof adhesion, corrosion resistance, etc. even when only a single coating was applied. However, in the comparative examples, when NCO % is less than 2.5 or more than 3.1 or the amount of the urethane prepolymer is more than 250 parts by weight, a portion of the inorganic materials is not present within the urethane prepolymer particles but is dispersed in external water, undesirably decreasing acid resistance and corrosion resistance.

Although the embodiments of the present invention have been disclosed for illustrative purposes, those skilled in the art will appreciate that a variety of different variations and modifications are possible, without departing from the scope and spirit of the invention as disclosed in the accompanying claims.

Accordingly, the scope of the invention is determined by the claims and is not limited to the contents described herein, and the variations and modifications should also be understood as falling within the scope of the present invention.

What is claimed is:

1. An organic-inorganic hybrid composition for an anti-corrosive coating agent, including:
   metal flakes;
   a sol-gel resin;
   a polyurethane prepolymer having an NCO % of 2.5~3.1 and a weight average molecular weight of 70,000~100,000; and
   a solvent.

2. The organic-inorganic hybrid composition of claim 1, wherein the metal flakes are zinc flakes and have a major axis of 5~10 μm in length.

3. The organic-inorganic hybrid composition of claim 2, wherein the metal flakes are used in an amount of 80~110 parts by weight, and the solvent is used in an amount of 100~150 parts by weight.

4. The organic-inorganic hybrid composition of claim 3, wherein the sol-gel resin is used in an amount of 140~210 parts by weight, and the polyurethane prepolymer is used in an amount of 200~250 parts by weight.

5. The organic-inorganic hybrid composition of claim 4, wherein the sol-gel resin includes at least one selected from the group consisting of zirconium butoxide, isopropyl titanate, gamma-methacryloxypropyltrimethoxysilane, n-phenyl-gamma-aminopropyltrimethoxysilane and mixtures thereof.

6. The organic-inorganic hybrid composition of claim 5, wherein the sol-gel resin comprises 30~50 parts by weight of zirconium butoxide, 10~20 parts by weight of isopropyl titanate, 40~60 parts by weight of gamma-methacryloxypropyltrimethoxysilane and 60~80 parts by weight of n-phenyl-gamma-aminopropyltrimethoxysilane.

7. A method of manufacturing an organic-inorganic hybrid composition for an anti-corrosive coating agent, including:

1) mixing a solvent, metal flakes, and a sol-gel resin to create a mixture; and
2) mixing the mixture with a polyurethane prepolymer having an NCO % of 2.5~3.1 and a weight average molecular weight of 70,000~100,000 and performing stirring.

8. The method of claim 7, wherein in 2) a temperature is maintained at 20~30° C.

9. The method of claim 7, wherein in 2) a stirring rate is maintained at 1000~1500 rpm.

* * * * *